United States Patent
Pelletier et al.

(10) Patent No.: US 8,923,115 B2
(45) Date of Patent: Dec. 30, 2014

(54) USING THE ECN MECHANISM TO SIGNAL CONGESTION DIRECTLY TO THE BASE STATION

(75) Inventors: Ghyslain Pelletier, Laval (CA); Janne Peisa, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 97 days.

(21) Appl. No.: 13/390,983

(22) PCT Filed: Aug. 18, 2010

(86) PCT No.: PCT/SE2010/050894
§ 371 (c)(1),
(2), (4) Date: Feb. 17, 2012

(87) PCT Pub. No.: WO2011/025438
PCT Pub. Date: Mar. 3, 2011

(65) Prior Publication Data
US 2012/0147750 A1    Jun. 14, 2012

Related U.S. Application Data

(60) Provisional application No. 61/236,670, filed on Aug. 25, 2009.

(51) Int. Cl.
*G01R 31/08* (2006.01)
*H04W 28/10* (2009.01)
*H04L 12/801* (2013.01)
*H04L 12/833* (2013.01)
*H04W 28/02* (2009.01)

(52) U.S. Cl.
CPC ............... *H04W 28/10* (2013.01); *H04L 47/12* (2013.01); *H04L 47/14* (2013.01); *H04L 47/31* (2013.01); *H04W 28/02* (2013.01)

USPC .......................................................... 370/229

(58) Field of Classification Search
USPC .......... 370/229, 236, 232, 230, 231, 235, 249
See application file for complete search history.

(56) References Cited

U.S. PATENT DOCUMENTS 6,741,555 B1 *   5/2004   Li et al. ........................ 370/229
7,760,646 B2     7/2010   Kekki
(Continued)

FOREIGN PATENT DOCUMENTS

CN            1581841 A     2/2005
CN          101116293 A     1/2008
(Continued)

OTHER PUBLICATIONS

3rd Generation Partnership Project. "ECN in MTSI." 3GPP TSG-SA4 #55, S4-090612, Aug. 17-21, 2009, Kista, Sweden.*

(Continued)

*Primary Examiner* — Phuongchau Ba Nguyen
(74) *Attorney, Agent, or Firm* — Coats & Bennett, PLLC (57) ABSTRACT

Techniques for a mobile station to signal a request for a reduction in data transmission rate to a base station are disclosed. An example method for facilitating flow control in a wireless communication system includes monitoring resource use associated with a mobile station and, based upon the resource use, setting a congestion indicator in a header of at least one uplink traffic data packet. The uplink traffic data packet is then sent to a wireless base station, which detects the congestion indicator. In some embodiments, ECN bits in an IP header of the uplink traffic data packet are set. In other embodiments, ECN bits in an IP header of a downlink traffic data packet are set, to trigger the generation of a TCP header that indicates congestion in subsequent uplink packets.

16 Claims, 8 Drawing Sheets

(56) References Cited

U.S. PATENT DOCUMENTS

| | | | |
|---|---|---|---|
| 8,427,949 B2* | 4/2013 | Yang | 370/232 |
| 2005/0063458 A1 | 3/2005 | Miyake et al. | |
| 2007/0058532 A1* | 3/2007 | Wadekar et al. | 370/229 |
| 2010/0246400 A1* | 9/2010 | Onishi et al. | 370/235 |
| 2011/0002224 A1* | 1/2011 | Tamura | 370/236 |

FOREIGN PATENT DOCUMENTS

| | | |
|---|---|---|
| EP | 2028798 A1 | 2/2009 |
| WO | 2006075951 A1 | 7/2006 |
| WO | 2008066429 A1 | 6/2008 |
| WO | 2009008817 A1 | 1/2009 |

OTHER PUBLICATIONS

3rd Generation Partnership Project. "DL Flow Control in LTE." 3GPP TSG-RAN WG2 #61, R2-081062, Feb. 11-15, 2008, Sorrento, Italy.

3rd Generation Partnership Project. "DL Flow Control in LTE." 3GPP TSG-RAN WG2 #61bis, R2-081777, Mar. 31-Apr. 4, 2008, Shenzhen, China.

3rd Generation Partnership Project. "DL Flow Control in LTE." 3GPP TSG-RAN WG2 #66bis, R2-094061, Jun. 29-Jul. 3, 2009, Los Angeles, USA.

* cited by examiner

| | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

| Version | Length | DifferServ | ECT | CE |
|---|---|---|---|---|
| Total Length ||||||
| Identification ||||||
| Flags | Fragment Offset ||||
| Time to Live | Protocol |||
| Header Checksum |||||
| Source Address |||||
| Source Address |||||
| Destination Address |||||
| Destination Address |||||

*FIG. 10*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| HEADER LENGTH |||| RESERVED ||||  CWR | ECE | URG | ACK | PSH | RST | SYN | FIN |

USING THE ECN MECHANISM TO SIGNAL CONGESTION DIRECTLY TO THE BASE STATION

FIELD OF THE INVENTION

The present invention relates generally to flow control in communication systems, and more particularly relates to techniques for a mobile station to signal to a wireless base station a request for a reduction in data transmission rate.

BACKGROUND

Members of the $3^{rd}$-Generation Partnership Project (3GPP) are currently developing Release 9 improvements for the so-called Long-Term Evolution (LTE) wireless systems. As part of this work, the addition of a mechanism for downlink flow control is under consideration.

The motivation for downlink flow control is that a mobile station's demands for resources (e.g., processing power, memory, battery power) vary over time, depending, among other things, on the instantaneous data rates received and/or transmitted by the device. To keep the costs of mobile stations to reasonable levels, terminals are designed to handle the most common load conditions, rather than to handle the most advertised peak rate over sustained periods. In the event that a wireless base station (an evolved Node-B, or eNB, in LTE systems) directs downlink data to a mobile station at its highest achievable rate for a long period of time, a terminal running short on resources may be forced to drop data elements.

The objective of the downlink flow control mechanism desired for Release 9 LTE is thus to provide means for the mobile station to signal back to the eNB a request for a reduction in downlink data transmission rate. The eNB, upon receipt of this signal, then lowers the rate at which it schedules data on the downlink traffic channel (e.g., LTE's DL-SCH) for a certain period.

Several possible approaches have been described in proposals submitted to the LTE working group. One approach is to implement flow control at the Medium Access Control (MAC) layer. With this approach, a flow control indication to the eNB is provided by the mobile station as part of the MAC protocol by, for example, using a MAC Control Element or a bit in a MAC Control protocol data unit (PDU) header. Of course, a new or modified MAC control message would be needed to implement this approach. Another approach utilizes Radio Link Control (RLC) flow control: an indication is provided by the mobile station as part of the RLC protocol. This proposed approach is similar to that employed in the UTRAN (UMTS Terrestrial Radio Access Network) RLC, where the receiver controls a transmission window of the transmitter to enforce flow control. However, this approach is not likely to be very effective. Because the feedback is in units of RLC sequence numbers and because the RLC PDU can be very large, attempts to limit downlink data flow to a small number of RLC PDUs may still result in excessively large data transfers.

Still another approach exploits the existing channel quality mechanisms for LTE. With this approach, code points to indicate flow control levels are reserved in the Channel Quality Indicator (CQI) transmissions made by the mobile station (in LTE, on the UL-SCH or on PUCCH). While this approach would be relatively easy to standardize, it adds overhead to the frequently signaled CQIs, even when flow control is not needed. It has also been proposed that mobile stations can use Radio Resource Control (RRC) procedures to modify the User Equipment (UE) capabilities signaled to the base station, to indicate its maximum sustainable transmission rate. Again, this approach adds overhead, and may also involve processing times that limit the responsiveness of this approach.

Finally, end-to-end flow control, using transport layer signaling (e.g., transport control protocol, or TCP) or application layer signaling (e.g., real-time protocol, or RTP) has been proposed. With this approach, flow control is performed end-to-end by the transport or the application protocol. While this approach requires no modification to the wireless standards, it also is generally not suitable for controlling data flow in real-time, since the wireless base station is not involved in the end-to-end flow control process.

SUMMARY

Techniques for a mobile station to signal a request for a reduction in data transmission rate to a base station are disclosed. Some of these techniques involve a novel use of the existing Explicit Congestion Notification (ECN) mechanisms standardized for Internet communication. These techniques use the ECN mechanism to signal congestion directly to the base station and to thus trigger a reduction in downlink transmission rate, scheduled uplink transmission rate, or both, based on mobile station limitations such as insufficient memory resources or insufficient processing resources).

An example method for facilitating flow control in a wireless communication system begins with the monitoring of resource use associated with a mobile station. The monitored resource or resources may include, for example, one or several of processor utilization, memory utilization, and battery-charge level. Based upon the resource use associated with the mobile station, a congestion indicator is set in a header of at least one uplink traffic data packet, and the uplink traffic data packet is sent to a wireless base station.

In some embodiments, the method comprises setting the congestion indicator in the header of at least one uplink traffic data packet by adjusting one or more congestion control bits in an Internet-Protocol (IP) header of the at least one uplink traffic data packet. These congestion control bits are Explicit Congestion Notification (ECN) bits, in some embodiments, in which case a "Congestion Experienced" (CE) codepoint may be set in the IP header to signal congestion to the wireless base station.

In other embodiments, the congestion indicator in the header of at least one uplink traffic data packet is set by generating a transport-layer header for transmission in the one or more uplink traffic data packets, so that the transport-layer header comprises the congestion indicator. This transport-layer header comprises a Transport Control Protocol (TCP) header in some embodiments, in which case the congestion indicator comprises an ECN-Echo bit. In some of these embodiments, the method includes adjusting one or more first congestion control bits in an IP header for a downlink packet received by the mobile station and then generating the transport-layer header in response to the first congestion control bits in the IP header. This adjusting of one or more first congestion control bits in the IP header for the downlink packet received by the mobile station comprises setting ECN bits in some embodiments, to signal congestion to a transport-layer processing function in the mobile station.

Methods for implementation at a wireless base station are also disclosed. An example method comprises receiving an uplink traffic data packet sent by a mobile station, evaluating one or more headers included in the uplink traffic data packet to determine whether the mobile station is indicating congestion, and, based on said evaluating, adjusting a subsequent downlink transmission rate to the mobile station. Evaluation of the uplink traffic data packet headers at the base station may comprise detecting ECN bits in an IP header for the uplink traffic data packet, in some embodiments, the ECN bits signaling congestion to the wireless base station. In others, evaluation may instead comprise detecting an ECN-Echo bit in a TCP header for the uplink traffic data packet. Some embodiments further comprise determining whether ECN is configured for a transport data flow corresponding to the uplink traffic data packet and clearing ECN bits in the IP header before forwarding the traffic data packet, if ECN is not configured.

Mobile station and base station apparatus corresponding generally to the methods summarized above are also disclosed, and include processing circuits configured to carry out one or more of the flow control techniques described herein. Of course, those skilled in the art will appreciate that the present invention is not limited to the above features, advantages, contexts or examples, and will recognize additional features and advantages upon reading the following detailed description and upon viewing the accompanying drawings

DETAILED DESCRIPTION

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It may be evident to one of ordinary skill in the art, however, that one or more embodiments of the present invention may be implemented or practiced without one or more of these specific details. In other instances, well-known structures and devices are shown in block diagram form in order to facilitate describing one or more embodiments.

The techniques described herein can be applied to various wireless communication systems, including those that use code division multiple access (CDMA), time division multiple access (TDMA), frequency division multiple access (FDMA), orthogonal frequency division multiple access (OFDMA), single carrier-frequency division multiple access (SC-FDMA), or other radio access and modulation schemes. CDMA-based systems include those that are based on specifications for Universal Terrestrial Radio Access (UTRA), CDMA2000, etc. UTRA in turn includes Wideband-CDMA (W-CDMA) and other variants of CDMA, while CDMA2000 includes IS-2000, IS-95 and IS-856 standards. Well-known TDMA systems include the Global System for Mobile Communications (GSM), while systems based on OFDMA include Evolved UTRA (E-UTRA), Ultra Mobile Broadband (UMB), IEEE 802.11 (Wi-Fi), IEEE 802.16 (WiMAX), IEEE 802.20, Flash-OFDM, etc.

A system commonly known as Long Term Evolution (LTE) has recently been specified, as a release of 3GPP's UMTS specifications. LTE uses the E-UTRA radio access interface, employing OFDMA on the downlink and SC-FDMA on the uplink. While much of the discussion that follows is based on LTE systems, those skilled in the art will appreciate that the techniques described herein are not limited to that context but may be applied to other wireless communication systems.

Several of the embodiments are described herein in connection with a radio access terminal. A radio access terminal, which communicates wirelessly with fixed base stations in the wireless network, can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Similarly, various embodiments are described herein in connection with a wireless base station, which communicates with access terminals and which may be referred to in various contexts as an access point, Node B, Evolved Node B (eNodeB or eNB) or some other terminology. Although the various base stations discussed herein may be described or illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), that may or may not be implemented as a single physical unit.

As discussed above, the resources available to a mobile station for processing downlink data may vary over time. This is true for a number of reasons. First, a mobile station typically is not designed to operate at peak conditions for sustained periods of time. Second, mobile stations are growing increasingly more complex—as these mobile stations support more applications and functions, the processing requirements available for managing data transport may vary depending on how many functions and/or applications are in use simultaneously. Given that a mobile station is not over-designed, mobile station resources, such as processor capacity, memory capacity, battery charge levels, etc., will at least occasionally be limited. At the same time, the available downlink transmission rate may be more than is actually needed to support the running applications and to maintain the user's operating experience at acceptable levels. To avoid undesirable impacts to that user experience, it is therefore desirable to have a mechanism that allows the wireless base station, such as the eNB in LTE systems, to adapt the downlink transmission rates based on congestion signaling from the UE. In particular, a solution that effects flow control at layer 1/layer 2 (L1/L2) is desirable, so that the reaction times are fast enough to avoid or rapidly mitigate temporary overutilization of mobile station resources.

Many previously proposed or known flow control solutions fall into one of two categories. A first category includes flow control mechanisms that are implemented as part of the L1/L2 protocols, i.e., as part of the protocols that are specific to the wireless connection between the mobiles station and the base station. These flow control mechanisms include, for example, the MAC flow control, RLC flow Control, CQI flow control and UE-capability flow control mechanisms discussed above. With these mechanisms, the L1/L2 transmission rate may be adjusted rapidly (e.g., within one L2 round-trip time, or RTT), but the ultimate source of the data, (e.g., an Internet Protocol sender using, for example, TCP or RTP) will take more time to react. This is because the data source will not observe the L1/L2 flow control signaling directly, and will be unaware of a need to reduce data rates until buffers in the wireless base station are filled to the extent packets are discarded and missing packets reported back to the source. This approach obviously leads to the unnecessary discarding of data and may result in additional congestion events due to buffer build-up in the base station.

A second category involves end-to-end flow control, e.g., flow control performed between IP endpoints. In this case, however, the wireless base station is unaware of the flow control signaling; thus L1/L2 transmission will be adjusted slowly (i.e., taking more than one IP round-trip time), only after the IP sender detects the loss of one or more packets (i.e., a congestion event). This makes end-to-end flow control generally unsuitable for dynamic control of the wireless downlink rates, as it cannot adjust the L1/L2 transmission rate within one L1/L2 round-trip time.

Presented herein are improved techniques for a mobile station to signal back to a base station, such as an LTE eNB, a request for a reduction in downlink data transmission rate. Some of these techniques involve a novel use of the existing Explicit Congestion Notification (ECN) mechanisms standardized in the Internet engineering domain. These techniques use the ECN mechanism to signal congestion directly to the base station and to thus trigger a reduction in transmission rate, based on mobile station limitations such as insufficient memory resources or insufficient processing resources). Several variations of an approach based on ECN signaling are discussed below, as well as techniques involving signaling in the Packet Data Convergence Protocol (PDCP) layer.

Figure 10:
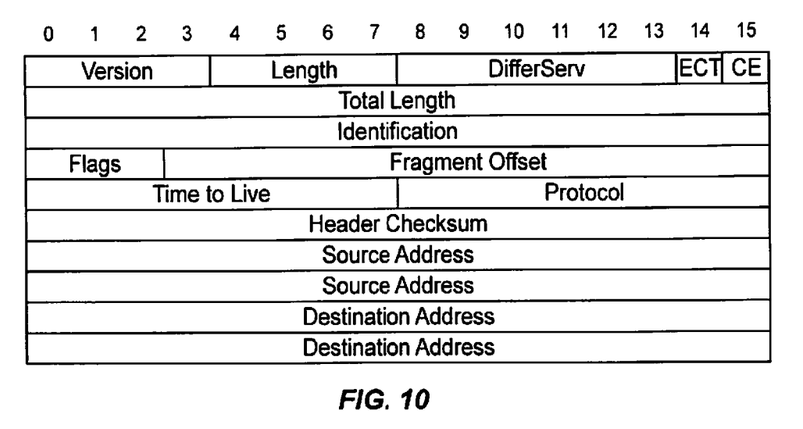
FIG. 10 illustrates an Internet Protocol packet, including Explicit Congestion Notification bits in the packet header.

Explicit Congestion Notification (ECN) is a three-step mechanism based on the marking of packets to indicate congestion in the network, receiver feedback of the congestion indications, and rate adaptation at the sender in response to the feedback, for the purpose of adjusting a data application's send rate in the event of network congestion. The details of ECN are described in a document published by the Internet Engineering Task Force (IETF), IETF RFC316, "The Addition of Explicit Congestion Notification (ECN) to IP," September 2001. ECN bits appear in an IP header as the last two bits of the IPv4 TOS (Type of Service) field or the IPv6 TC (Traffic Class) field, or the differentiated services field (DiffServ field), as shown in FIG. 10. The two ECN bits, labeled "ECT" and "CE" in FIG. 10, provide four codepoints. Two of those codepoints, '10' and '01' are set by a data sender to indicate that the end-points of the transport protocol are ECN-capable. The codepoint '00' indicates that the end-points for that packet are not using ECN. The final codepoint, the "Congestion Experienced" (CE) codepoint '11', can be set by any router during the packet's transport to indicate congestion to the end nodes.

A data receiver that observes the CE codepoint responds by sending feedback to the data sender. This feedback to the sender is typically sent inside the transport header (TCP, see below) or as part of the application protocol (e.g., RTP/RTCP). A data sender receiving this feedback indication is required to reduce its congestion window in the same manner as it would respond to a dropped packet. In particular, in TCP the standard congestion control algorithms (Slow-start, Fast Retransmit and Fast Recovery described in IETF RFC2581, "TCP Congestion Control," April 1999) apply, with the TCP sender reacting to congestion feedback from the receiver in the same way as the sender responds to a dropped packet.

Figure 11:
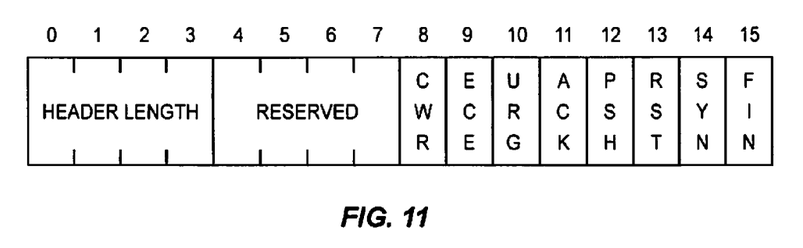
FIG. 11 illustrates a Transport Control Protocol header, including the ECN-Echo bit.

Two flags are used in the TCP header to support ECN. These two flags occupy two bits that were formerly reserved, thus the use of two bits for the ECN Field leaves the Reserved field as a 4-bit field using bits 4-7, as shown in FIG. 11. First, the TCP mechanism for negotiating ECN-Capability uses the ECN-Echo (ECE) flag in the TCP header. Bit 9 in the Reserved field of the TCP header is designated as the ECN-Echo flag, as shown in FIG. 11. A data receiver that receives an IP packet with the CE flag set responds by setting the ECN-Echo flag in the TCP header for one or more subsequent packets sent back to the sender of the first packet.

A second new flag, the CWR flag, is introduced into the TCP header to enable the TCP receiver to determine when to stop setting the ECN-Echo flag. The CWR flag appears at bit 8 of the TCP header. CWR, which stands for "Congestion Window Reduced," is defined in RFC3168. In short, the CWR is used by a data sender to acknowledge its receipt of (and acting upon) an ECN-Echo flag.

Thus, ECN uses the ECT and CE flags in the IP header (as shown in FIG. 10) for signaling between routers and connection endpoints, and uses the ECN-Echo and CWR flags in the TCP header (as shown in FIG. 11) for TCP-endpoint to TCP-endpoint signaling. The basic process can be summarized as follows: First, an ECT codepoint is set in the IP headers of packets transmitted by a sender, to indicate that ECN is supported by the transport entities. An ECN-capable router detects impending congestion, and detects that an ECT codepoint is set in a packet it would otherwise drop. In other words, the router detects that the endpoints support ECT. Instead of dropping the packet, the router instead sets the CE codepoint and forwards the packet to its destination. A receiver observes the CE codepoint, and sets the ECN-Echo flag in its next TCP ACK sent to the sender. The sender receives the TCP ACK with the ECN-Echo flag, and responds in the same manner as if a packet had been dropped. The sender acknowledges the receipt of the ECN-Echo flag by setting the CWR flag in the TCP header of the next packet sent to the receiver.

In the procedure discussed above, ECN is used to allow routers to signal end-points to slow down data transmission. End points signal their ability to use ECN and respond appropriately to CE indications set by routers. However, this conventional use of the ECN signaling mechanisms does not allow a TCP end-point to signal an intermediate network node, such as a wireless base station, to reduce data transmission rates. According to several embodiments of the present invention, however, a mobile station ("user equipment" or "UE" in 3GPP terminology) uses the ECN mechanism to signal to the wireless network to adjust the scheduling and instantaneous allocation of L1/L2 (radio) resources. On the network side, a wireless base station, such as an LTE eNB, is adapted to adjust scheduling and instantaneous allocation of L1/L2 (radio) resources in response to the ECN mechanism.

Figure 1:
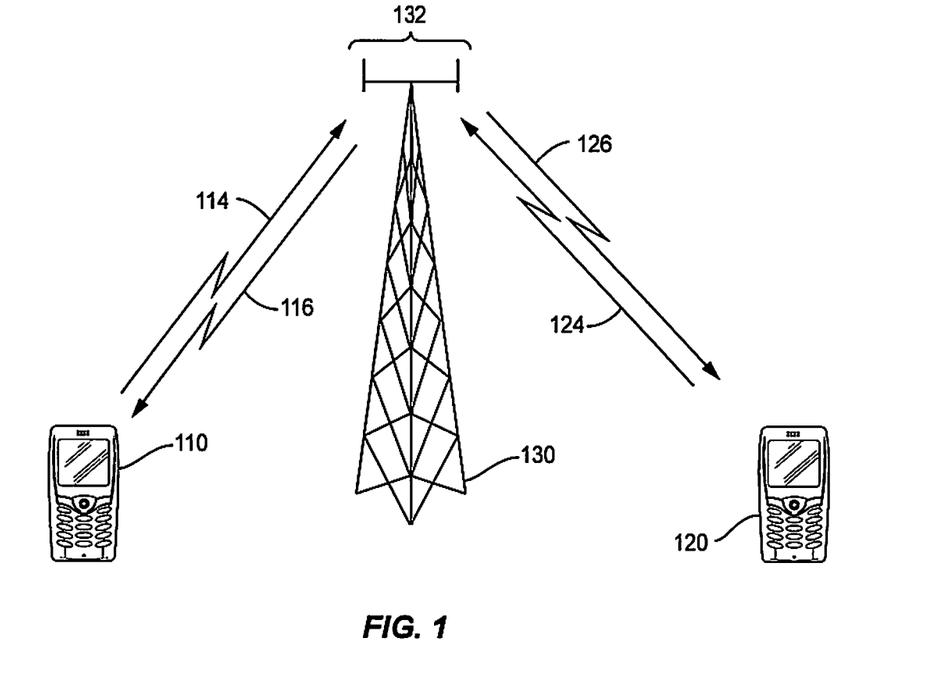
FIG. 1 illustrates a wireless communication system in accordance with some embodiments of the present invention.

FIG. 1 illustrates components of a wireless network 100, including mobile stations 110 and 120 and base station 130. Base station 130 communicates with mobile stations 110 and 120 via one of more antennas 132; individual ones or groups of these antennas may be used to serve pre-defined sectors and/or to support any of various multi-antenna transmission schemes, such as multiple-input multiple-output (MIMO) transmission schemes. In the system illustrated in FIG. 1, mobile station 110 is communicating with base station 130 over an uplink (mobile station-to-base station) 114 and a downlink (base station-to-mobile station) 116. Similarly, mobile station 120 is communicating with base station 130 over an uplink 124 and a downlink 126.

Figure 2:
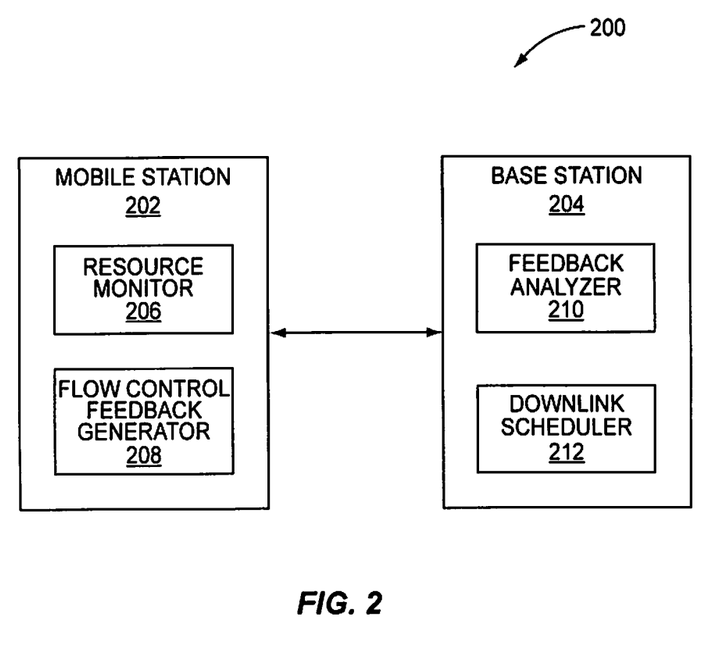
FIG. 2 is a block diagram illustrating elements of a downlink flow control system.

FIG. 2 is a block diagram illustrating a few of the functional elements of a downlink flow control system in a wireless communication system. System 200 includes a mobile station 202, which communicates with a base station 204 via the downlink and uplink. (The terms "forward link" and "reverse link" are sometimes used instead of "downlink" and "uplink".) Mobile station 202 includes a resource monitor 206 and a flow control feedback generator 208, while base station 204 includes a feedback analyzer 210 and a downlink scheduler 212. These functional modules, which may be implemented as electronic hardware or as a combination of hardware and software, interact according to one or several of the techniques described herein to provide downlink flow control.

In mobile station 202, resource monitor 206 monitors the usage of one or several resources used by the mobile station. Monitored resources can include processor speed, or related metrics such as available or utilized processor cycles, etc. Battery-charge levels, utilized bus speeds, buffer statuses (e.g., buffer fill levels, buffer overflows, etc.), and various other resources may also be monitored. By monitoring these resources and tracking them against one or more pre-determined thresholds and/or limits, resource monitor 206 can detect actual or impending overloading of one or more of these resources. For example, processor utilization (e.g., measured in percentage) above a certain threshold may indicate actual or imminent overloading or congestion of the mobile station's resources. Similarly, a battery-charge level falling below a certain threshold may also indicate overtaxing of the user terminal's resources. Various monitored parameters and thresholds may be combined to indicate overloading and that data transmission rates should be reduced, as well.

Flow control feedback generator 208 is configured to respond to resource monitor 206 by triggering appropriate flow control mechanisms. In particular, as will be described in more detail, flow control feedback generator 208 is configured to respond to excessive resource utilization by generating feedback information to be sent to base station 204, which can respond in turn by reducing downlink data transmission rates.

Base station 204 receives the flow control feedback sent from mobile station 202. Feedback analyzer 210 reviews the obtained flow control feedback, to determine whether mobile station 202 has requested a reduction in downlink data rate (or whether the feedback from mobile station 202 otherwise indicates that a reduction in downlink transmission rate is appropriate). The results of this feedback analysis is then used by downlink scheduler 212, which adjusts downlink transmission rates and other transmission parameters for one or more subsequent transmissions to mobile station 202. Flow control feedback from mobile station 202 may include uplink flow control information, in some embodiments, such as an indication by mobile station 202 that a lower uplink data rate is requested, in which case an uplink scheduler (not shown) may also adjust scheduled uplink transmission rates and other uplink transmission parameter.

Figure 3:
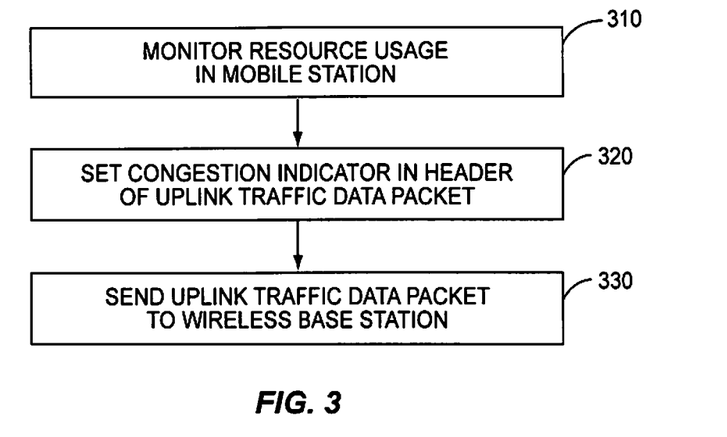
FIG. 3 is a process flow diagram illustrating a method for facilitating flow control in a wireless communication system.

FIG. 3 is a process flow diagram illustrating an example method for facilitating flow control in a wireless communication system, such as might be implemented in mobile station 202 of FIG. 2. As shown at block 310, the process includes monitoring resource usage in the mobile station, to determine whether overloading of the mobile terminal is occurring or is imminent, or to otherwise determine that a change in wireless data transmission rates is desirable. This monitoring process may include, for example, the detection of insufficient processing resources, insufficient memory resources, or battery resources, or some combination thereof.

As shown in block 320, the mobile terminal responds to the monitored resource use in various embodiments of the invention by setting a congestion indicator in a header of at least one uplink traffic data packet. (A more detailed explanation of each of these processes is given below.) The uplink traffic data packet is then sent to the base station, as shown in block 330—the congestion indicator can then be used by the wireless base station in adjusting downlink data transmission rates, uplink data transmission rates, or both.

One technique for setting the congestion indicator in the uplink traffic data packet exploits the reserved bits in the Packet Data Convergence Protocol (PDCP) PDU header. Currently there are three reserved bits in the first octet of the PDCP PDU header—any one or several of these may be used as a congestion indicator, to signal the base station to reduce transmission rates.

At least two other distinct approaches by which the mobile station can signal congestion to a wireless base station involve the manipulation of IP header bits and/or TCP header bits in traffic data packets. In one approach, which can be used to perform per-hop flow control, the mobile station signals congestion to the base station by adjusting the ECN (ECT/CE) bits in the IP header of a PDCP SDU for a subsequent uplink transmission. In particular, the mobile station sets the bits to the CE codepoint. The wireless base station is correspondingly configured to monitor the IP headers in uplink packets. Because the CE codepoint is not normally set by endpoints, the wireless base station can interpret the CE codepoint as an indicator that the mobile station is experiencing or expecting resource overutilization, and adjust downlink transmission rates in response. (In some embodiments, uplink transmission rates might be adjusted as well.) Thus, the base station (or other network node) inspects the ECN (ECT/CE) bits in the IP header of the PDCP SDU received in uplink transmissions to detect indication of congestion and downlink L1/L2 transmission rates are adjusted accordingly. Note that if the current flow state indicates that ECN is not enabled, the base station clears the ECN bits back to the "not ECN-capable" code point, to avoid confusing the remote endpoint. If ECN is enabled, the CE codepoint can be left as is, so that the remote data source reduces its congestion window.

Another approach exploits ECN's existing end-to-end flow control mechanism. If the mobile station's resources are overtaxed and if the transport layer or the application layer is ECN-capable, then the mobile station sets the CE codepoint in the IP header of a PDCP SDU received in the downlink, before the packet is processed by the IP layer of the mobile station's protocol stack. This will cause the mobile station's IP layer to notify the TCP layer of congestion, per the protocol stack's normal congestion control procedures. (Alternatively, the mobile station's protocol stack could be modified so that the mobile station's TCP receiver is notified directly that congestion is experienced, or to directly signal the mobile station's TCP sender to signal back to the remote TCP sender that congestion is experienced.) The TCP layer will respond by setting the ECN-Echo flag in the TCP header of subsequent uplink packets.

With this approach, the base station (or other network node) inspects the ECN bits in the TCP header for each PDCP SDU received in uplink transmissions to detect mobile station congestion, and responds by adjusting downlink L1/L2 transmission rates. The remote sender will also adjust its behavior, in accordance with the normal operation of the ECN mechanism.

Figure 4:
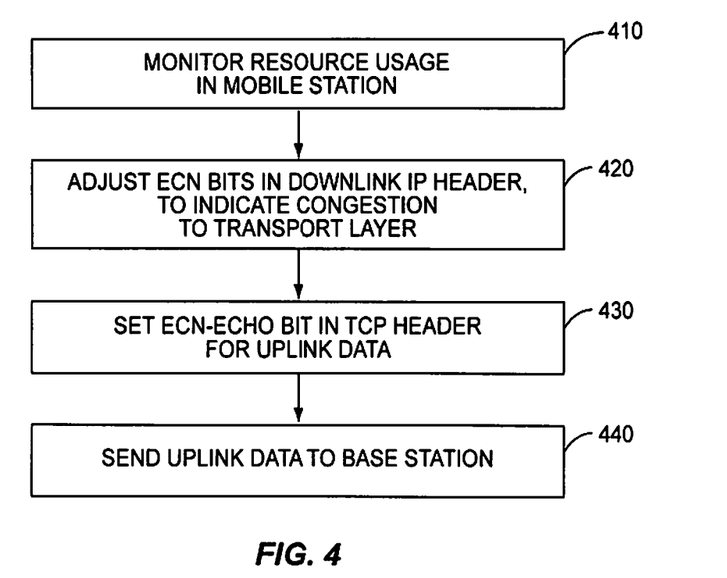
FIG. 4 is another process flow diagram illustrating a method for facilitating flow control using the ECN bits in downlink IP headers.

FIG. 4 is a process flow diagram illustrating details of this approach. As shown at block 410, the mobile station monitors resource usage, which may involve monitoring one or more of processor utilization, memory utilization, battery charge level, or other mobile station resource. As shown at block 430, ECN bits in a downlink IP header are adjusted, based on the resource monitoring, to indicate congestion. In particular, the mobile station sets the Congestion Experienced (CE) codepoint in the IP header. In effect, the mobile station's IP layer is notifying the mobile station's transport layer that congestion is occurring (or is imminent). As shown at block 430, the mobile station then sets congestion control bits in an uplink traffic data packet—in particular, the ECN-Echo bit in the TCP header for a subsequent uplink data packet is set. (This is the normal response to detecting the CE codepoint in downlink IP headers—thus, no modification to the mobile station's TCP layer is required in some embodiments.) The uplink packet is then transmitted to the base station, as shown in block 440.

Figure 12:
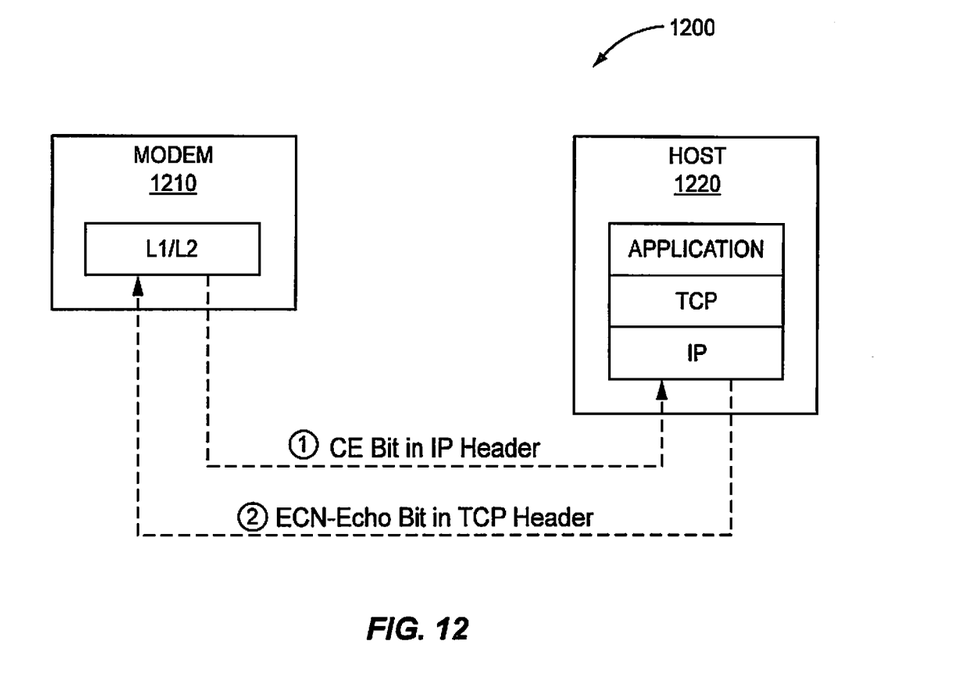
FIG. 12 illustrates downlink-related flow control messaging between a modem device and a host computer.

The approach illustrated in FIG. 4 is particularly useful in situations where the mobile station comprises two distinct modules. This is illustrated in FIG. 12, where mobile station 1200 includes a modem portion 1210 and a host portion 1220. Modem 1210 might be a plug-in module, such as a USB module, in some embodiments, or a modem card built into a host computer, in others. In either case, user applications are running on the host portion 1210 and may communicate with remote applications using standard TCP and IP signaling, as shown. The lower layers associated with the wireless network reside on the modem 1210, as indicated by the "L1/L2" block. (Not shown are any details of the host-to-modem interface, which might utilize, for example, PPP.) With this split architecture, the modem 1210 may have no direct means for notifying the host 1210 that the modem is experiencing or expecting congestion (e.g., buffers filling up.) By setting the CE codepoint in the IP header for one or more downlink headers, the host 1210 is effectively "tricked" into responding with one or more uplink packets that have the ECN-Echo bit set in the TCP header.

Figure 5:
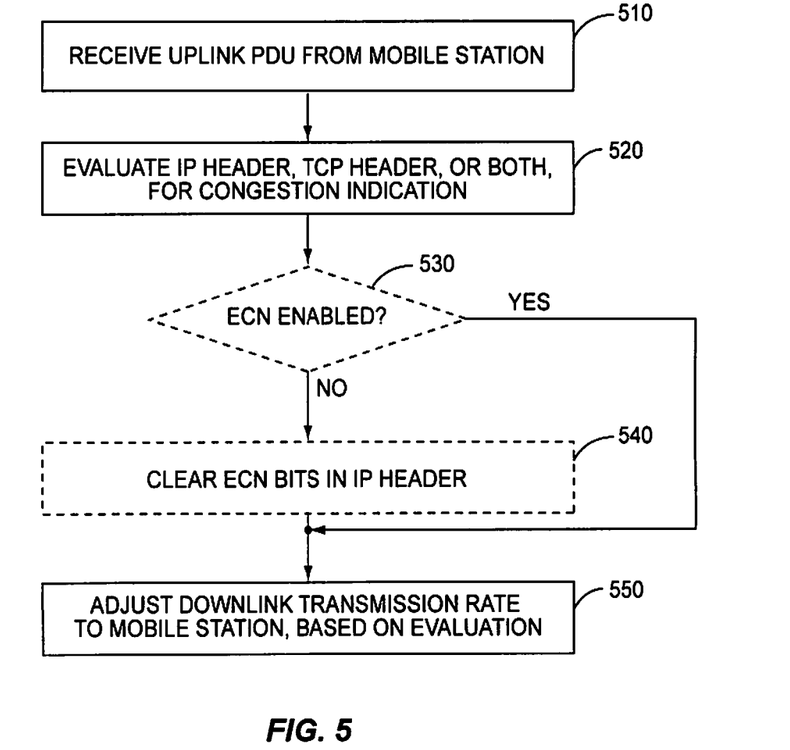
FIG. 5 is another process flow diagram illustrating the processing of flow control indicators received from a mobile station.

FIG. 5 is a process flow diagram illustrating an example method for downlink flow control that might be implemented in a base station such as an LTE eNB. As shown at block 510, the process begins with the receipt of an uplink PDU transmitted from a mobile station. The base station evaluates the IP header, the TCP header, or both, to check for a congestion indication, as indicated at block 520. In some embodiments, the IP header is evaluated for the presence of the CE codepoint—because transport endpoints do not normally set the CE codepoint, the base station can interpret its presence as an indication from the mobile station that it is experiencing resource utilization. In other embodiments, the base station inspects the TCP header for the ECN-Echo bit. In either case, as shown at block 550, the downlink transmission rate to the mobile station is adjusted, based on this evaluation.

In some embodiments, the base station is further configured to check whether the transport flow to which the uplink PDU belongs is configured to support ECN. This is shown in FIG. 5 at block 530. If the flow is not configured for ECN, then the CE codepoint in the IP header of the uplink PDU is cleared before the packet is forwarded, to avoid confusing subsequent network nodes. If the TCP flow corresponding to the packet is configured for ECN, then any CE codepoint set by the mobile station can be left unaltered. As discussed above, this will trigger the remote source to reduce its data transmission rate as well, complementing the L1/L2 data rate reduction performed by the base station.

Figure 6:
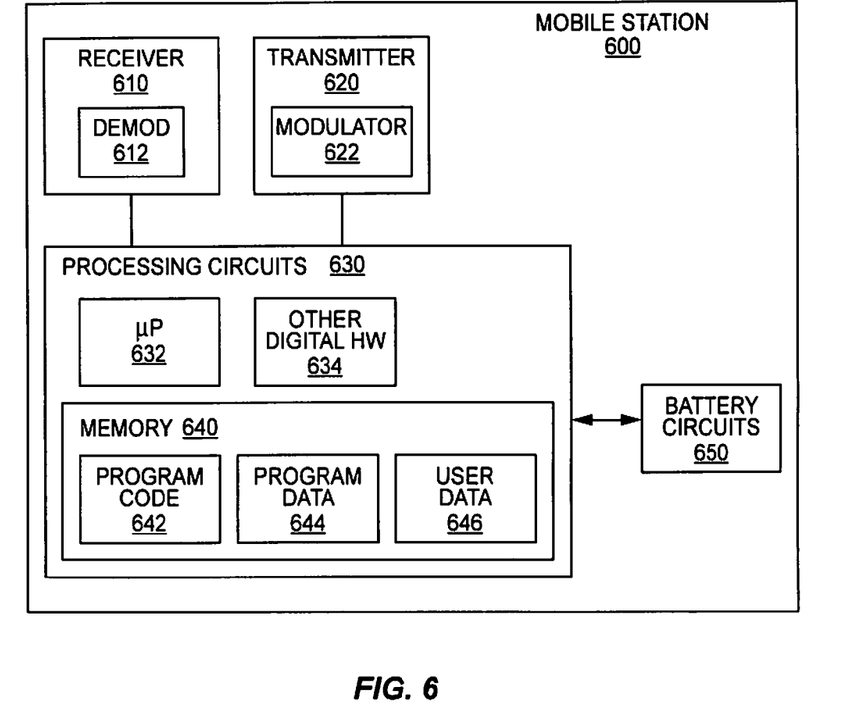
FIG. 6 is a block diagram of an example mobile station configured according to some embodiments of the present invention.

FIG. 6 is a block diagram of a mobile station 600 configured to facilitate flow control in a wireless communication system according to the techniques disclosed herein. In particular, mobile station 600 may be configured to implement the methods illustrated in FIGS. 3 and/or 4, or variants thereof. Mobile station 600 includes a receiver circuit 610, which includes various radio-frequency components (not shown) and a demodulator circuit 612. Receiver 610 processes radio signals received from one or more wireless base station and processes the signals, using known radio processing and signal processing techniques, to convert the received radio signals into digital samples for processing by processor circuits 630. Processing circuits 630 extract data from signals received via receiver 610 and generate information for transmission to the wireless base station via transmitter circuit 620. Like the receiver 610 and demodulator 612, transmitter 620 and modulator 622 use known radio processing and signal processing components and techniques, typically according to one or more telecommunications standards, and are configured to format digital data and generate and condition a radio signal, from that data, for transmission over the air.

Processing circuits 630 comprise one or several microprocessors 632, digital signal processors, and the like, as well as other digital hardware 634 and memory circuit 640. Memory 640, which may comprise one or several types of memory such as read-only memory (ROM), random-access memory, cache memory, flash memory devices, optical storage devices, etc., stores program code 642 for executing one or more telecommunications and/or data communications protocols and for carrying out one or more of the flow control techniques described herein. Memory 640 further stores program data 644, user data 646 received from the wireless base station and to be transmitted to the base station, and may further store various parameters, pre-determined threshold values, and/or other program data for controlling the operation of the mobile station 600. Mobile station 600 obviously includes various other feature that are not shown, in addition to the battery circuits 650 pictured in FIG. 6; these features, such as user interface circuitry, positioning circuits, and the like, are well known to those skilled in the art and are therefore not illustrated.

Figure 7:
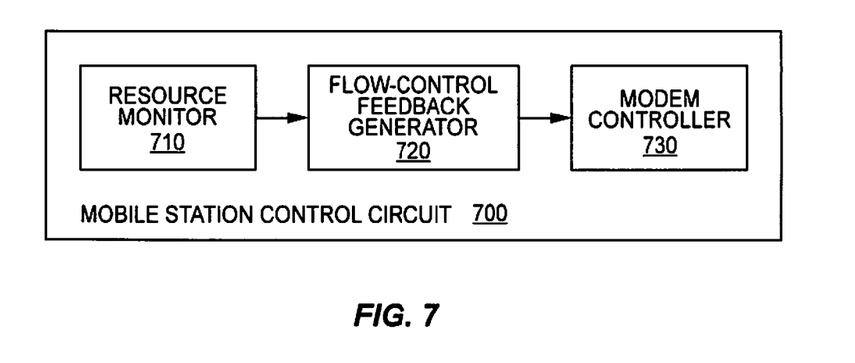
FIG. 7 illustrates a mobile station control circuit according to some embodiments of the present invention.

In some embodiments, processing circuits 630, using appropriate program code 642 stored in memory 640, are configured to implement one or more of the flow-control techniques described herein. Of course, not all of the steps of these techniques are necessarily performed in a single microprocessor or even in a single module. As seen in FIG. 12, for example, parts of the protocol stack for a given data flow may reside in separate modem and host computer units. Thus, FIG. 7 presents a more generalized view of a mobile station control circuit 700 configured to carry out one or several of the flow-control techniques discussed herein. This mobile station control circuit 700 may have a physical configuration that corresponds directly to processing circuits 630, for example, or may be embodied in two or more modules or units, like the configuration illustrated in FIG. 12. In any case, however, control circuit 700, is configured to implement at least three functions. These functions are pictured in FIG. 7 as resource monitor 710, flow-control feedback generator 720, and modem controller.

Resource monitor 710 monitors resource usage for the mobile station. As discussed above, the monitored resource or resources might include one or several of processor utilization, memory utilization, and battery charge level. Based upon the resource use associated with the mobile station, flow-control feedback generator 720 sets a congestion indicator in a header of at least one uplink traffic data packet. Modem controller 730 then sends the uplink traffic data packet to the wireless base station.

In some embodiments, the processing circuits of mobile station controller circuit 700 are configured to set the congestion indicator in the header of at least one uplink traffic data packet by directly adjusting one or more congestion control bits, such as the ECN bits, in an IP header of the uplink traffic data packet. In other embodiments, mobile station controller circuit 700 is configured to set the congestion indicator in the header of at least one uplink traffic data packet by generating a transport-layer header for transmission in the uplink traffic data packets; this transport-layer header comprises the congestion indicator in these embodiments. In the case of TCP, the congestion indicator comprises the ECN-Echo bit. In some of these embodiments, mobile station controller circuit 700 is configured to adjust congestion control bits in the IP header of a downlink packet received by the mobile station and to generate the transport-layer header in response to the congestion control bits in the IP header.

Figure 8:
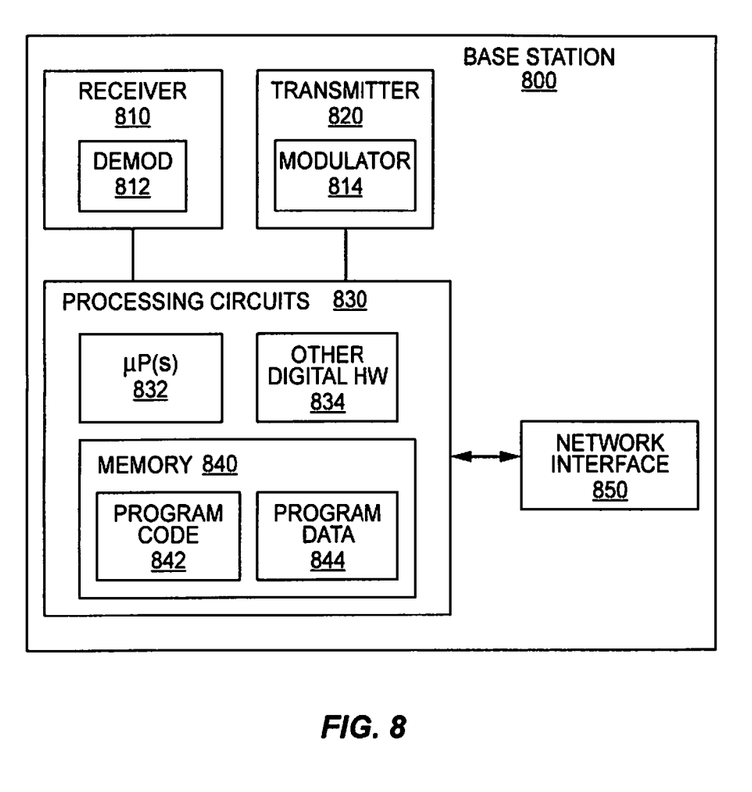
FIG. 8 is a block diagram of an example base station configured according to some embodiments of the present invention

FIG. 8 is a block diagram of a wireless base station 800 configured to perform flow control in a wireless communication system according to the techniques disclosed herein. In particular, base station 800 may be configured to implement the method illustrated in FIG. 5, or variants thereof. Base station 800 includes a receiver circuit 810, which includes various radio-frequency components (not shown) and a demodulator circuit 812. Receiver 810 processes radio signals received from one or more mobile stations and processes the signals, using known radio processing and signal processing techniques, to convert the received radio signals into digital samples for processing by processor circuits 830. Processing circuits 830 extract data from signals received via receiver 810 and generate information for transmission to the one or more mobile stations via transmitter circuit 620. Like the receiver 810 and demodulator 812, transmitter 820 and modulator 830 use known radio processing and signal processing components and techniques, typically according to a particular telecommunications standard such as the 3GPP standard for LTE, and are configured to format digital data and generate and condition a radio signal for transmission over the air.

Processing circuits 830 comprise one or several microprocessors 832, digital signal processors, and the like, as well as other digital hardware 834 and memory circuit 840. Memory 840, which may comprise one or several types of memory such as read-only memory (ROM), random-access memory, cache memory, flash memory devices, optical storage devices, etc., stores program code 842 for executing one or more telecommunications and/or data communications protocols and for carrying out one or more of the flow control techniques described herein. Memory 840 further stores program data 844 as well as buffered traffic data received from mobile stations and from network interface 850, and may further store various parameters, pre-determined threshold values, and/or other program data for controlling the general operation of the mobile station 800.

Figure 9:
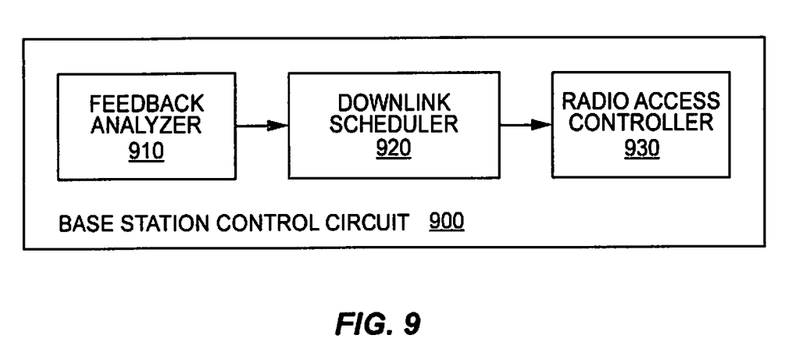
FIG. 9 illustrates a base station control circuit according to some embodiments of the present invention.

In various embodiments, processing circuits 830, using appropriate program code 842 stored in memory 840, are configured to implement one or more of the flow-control techniques described herein. Of course, not all of the steps of these techniques are necessarily performed in a single microprocessor or even in a single module. For instance, while an LTE eNB may include scheduling functionality that dynamically allocates link resources to individual users, other systems may place scheduling or other resource allocation functionality in a physically separate unit. Thus, FIG. 9 presents a more generalized view of a base station control circuit 900 configured to carry out one or several of the flow-control techniques described herein. This base station control circuit 900 may have a physical configuration that corresponds directly to processing circuits 830, for example, or may be embodied in two or more modules or units. In any case, however, base station control circuit 900 is configured to implement at least three functions, which are pictured in FIG. 9 as feedback analyzer 910, downlink scheduler 920, and modem controller 930.

Modem controller 930 controls the radio functions of the base station, and is thus configured to receive uplink traffic data packets sent by mobile stations. In various embodiments, feedback analyzer 910 is configured to evaluate one or more headers included in the uplink traffic data packets to determine whether the mobile station is indicating congestion. Based on this evaluation, downlink scheduler 920 adjusts a transmission rate for subsequent downlink transmissions to the mobile station.

In some embodiments, feedback analyzer 910 is configured to evaluate IP headers in uplink traffic data packets and to detect ECN bits in the IP headers to determine that a mobile station is signaling congestion. In some of these embodiments, the base station control circuit 900 is further configured to determine whether ECN is configured for the transport data flow corresponding to the uplink traffic data packet and, if not, to clear the ECN bits in the IP header before forwarding the uplink traffic data packet. In other embodiments, feedback analyzer 910 is configured to evaluate the one or more headers by detecting an ECN-Echo bit in a Transport Control Protocol, TCP, header for the uplink traffic data packet, the ECN-Echo bit signaling congestion to the wireless base station.

Examples of several embodiments of the present invention have been described in detail above, with reference to the attached illustrations of specific embodiments. Because it is not possible, of course, to describe every conceivable combination of components or techniques, those skilled in the art will appreciate that the present invention may be implemented in other ways than those specifically set forth herein, without departing from essential characteristics of the invention. The present embodiments are thus to be considered in all respects as illustrative and not restrictive, and all modifications and variations that fall within the scope of the appended claims are intended to be embraced therein.

What is claimed is:

1. A method, in a mobile station, for facilitating flow control in a wireless communication system, the method comprising:
   monitoring resource use associated with the mobile station, the monitoring comprising evaluating one or more of:
   processor utilization;
   memory capacity;
   battery charge level;
   based upon the resource use associated with the mobile station, setting a congestion indicator in a header of at least one uplink traffic data packet;
   sending the at least one uplink traffic data packet to a wireless base station.

2. The method of claim 1, wherein setting the congestion indicator in the header of at least one uplink traffic data packet comprises adjusting one or more congestion control bits in an Internet-Protocol header of the at least one uplink traffic data packet.

3. The method of claim 2, wherein adjusting one or more congestion control bits in the Internet-Protocol header for the at least one uplink traffic data packet comprises setting Explicit Congestion Notification (ECN) bits in the Internet-Protocol header to signal congestion to the wireless base station.

4. The method of claim 3, wherein adjusting one or more congestion control bits in the Internet-Protocol header for the at least one uplink traffic data packet comprises setting a Congestion Experienced (CE) codepoint in the Internet-Protocol header to signal congestion to the wireless base station.

5. The method of claim 1, wherein setting the congestion indicator in the header of at least one uplink traffic data packet comprises generating a transport-layer header for transmission in the one or more uplink traffic data packets, wherein the transport-layer header comprises the congestion indicator.

6. The method of claim 5, wherein the transport-layer header comprises a Transport Control Protocol (TCP) header, and the congestion indicator comprises an ECN-Echo bit.

7. The method of claim 5, comprising adjusting one or more first congestion control bits in an Internet-Protocol header for a downlink packet received by the mobile station and generating the transport-layer header in response to the first congestion control bits in the Internet-Protocol header.

8. The method of claim 7, wherein adjusting one or more first congestion control bits in the Internet-Protocol header for the downlink packet received by the mobile station comprises setting Explicit Congestion Notification (ECN) bits in the Internet-Protocol header, to signal congestion to a transport-layer processing function in the mobile station.

9. The method of claim 8, wherein adjusting one or more first congestion control bits in an Internet-Protocol header for a downlink packet received by the mobile station comprises setting a Congestion Experienced (CE) codepoint in the Internet-Protocol header, to signal congestion to a transport-layer processing function in the mobile station.

10. A mobile station, comprising:
    one or more processing circuits configured to:
    monitor resource use associated with the mobile station by evaluating one or more of:
    processor utilization;
    memory capacity;
    battery charge level;
    based upon the resource use associated with the mobile station, set a congestion indicator in a header of at least one uplink traffic data packet;
    send the at least one uplink traffic data packet to a wireless base station.

11. The mobile station of claim 10, wherein the one or more processing circuits are configured to set the congestion indicator in the header of at least one uplink traffic data packet by adjusting one or more congestion control bits in an Internet-Protocol header of the at least one uplink traffic data packet.

12. The mobile station of claim 11, wherein the one or more processing circuits are configured to adjust one or more congestion control bits in the Internet-Protocol header for the at least one uplink traffic data packet by setting Explicit Congestion Notification (ECN) bits in the Internet-Protocol header to signal congestion to the wireless base station.

13. The mobile station of claim 10, wherein the one or more processing circuits are configured to set the congestion indicator in the header of at least one uplink traffic data packet by generating a transport-layer header for transmission in the one or more uplink traffic data packets, wherein the transport-layer header comprises the congestion indicator.

14. The mobile station of claim 13, wherein the transport-layer header comprises a Transport Control Protocol (TCP) header, and the congestion indicator comprises an ECN-Echo bit.

15. The mobile station of claim 13, wherein the one or more processing circuits are configured to adjust one or more first congestion control bits in an Internet-Protocol header for a downlink packet received by the mobile station and to generate the transport-layer header in response to the first congestion control bits in the Internet-Protocol header.

16. The mobile station of claim 15, wherein the one or more processing circuits are configured to adjust one or more first congestion control bits in the Internet-Protocol header for the downlink packet received by the mobile station by setting Explicit Congestion Notification (ECN) bits in the Internet-Protocol header, to signal congestion to a transport-layer processing function in the mobile station.

* * * * *

UNITED STATES PATENT AND TRADEMARK OFFICE
CERTIFICATE OF CORRECTION

PATENT NO. : 8,923,115 B2  
APPLICATION NO. : 13/390983  
DATED : December 30, 2014  
INVENTOR(S) : Pelletier et al.

Page 1 of 1

It is certified that error appears in the above-identified patent and that said Letters Patent is hereby corrected as shown below:

In the Specification

In Column 5, Lines 66-67, delete "(DiffSery" and insert -- (DiffServ --, therefor.

In Column 9, Line 21, delete "430," and insert -- 420, --, therefor.

In Column 9, Line 43, delete "host portion 1210" and insert -- host portion 1220 --, therefor.

In Column 9, Line 50, delete "host 1210" and insert -- host 1220 --, therefor.

In Column 9, Line 53, delete "host 1210" and insert -- host 1220 --, therefor.

In Column 11, Line 54, delete "circuit 620." and insert -- circuit 820. --, therefor.

In Column 11, Line 56, delete "modulator 830" and insert -- modulator 814 --, therefor.

Signed and Sealed this  
Thirtieth Day of June, 2015

Michelle K. Lee  
*Director of the United States Patent and Trademark Office*